Nov. 1, 1938.   W. H. BASELT   2,135,120
BRAKE ARRANGEMENT
Filed June 17, 1935   5 Sheets-Sheet 1

Fig. 1

Inventor
Walter H. Baselt
Wilkinson, Huxley, Byron Knight Attorneys

Nov. 1, 1938.                W. H. BASELT                2,135,120
                           BRAKE ARRANGEMENT
                         Filed June 17, 1935           5 Sheets-Sheet 2

Inventor
Walter H. Baselt
Wilkinson, Huxley,
Byron & Knight
Attorneys

Nov. 1, 1938.   W. H. BASELT   2,135,120
BRAKE ARRANGEMENT
Filed June 17, 1935   5 Sheets-Sheet 3

Inventor:-
Walter H. Baselt

Patented Nov. 1, 1938

2,135,120

UNITED STATES PATENT OFFICE 2,135,120

BRAKE ARRANGEMENT

Walter H. Baselt, Chicago, Ill., assignor to American Steel Foundries, Chicago, Ill., a corporation of New Jersey Application June 17, 1935, Serial No. 27,066

39 Claims. (Cl. 188—56)

This invention pertains to brake mechanism.

It is desirable in some constructions of trains or cars to provide brake equipment which, while effective and powerful enough to handle the loads imposed upon it, still is disposed so as not to restrict the space between the end rails and side frames of the truck. This is particularly true in the present high speed type of trains wherein the motors are mounted on certain of the trucks, and other trucks are used to articulate adjacent cars.

It is therefore an object of this invention to provide a brake mechanism which will be effective for braking operation of high speed trains, yet is disposed to provide ample clearance for the mounting of the car bodies and the driving mechanism.

Another object is to provide a brake mechanism which is simple in form, inexpensive to make and maintain, and may be provided for each wheel and axle assembly.

Yet another object is to provide a brake mechanism which is flexible and may be provided with operating means disposed transversely of the truck.

A further object is to provide brake mechanism wherein automatic slack adjusting means is provided, which mechanism may be disposed transversely of the truck.

With these and various other objects in view, the invention may consist of certain novel features of construction and operation as will be more fully described and particularly pointed out in the specification, drawings and claims appended hereto.

In the drawings, which illustrate embodiments of the device, and wherein like reference characters are used to designate like parts—

Figure 1:
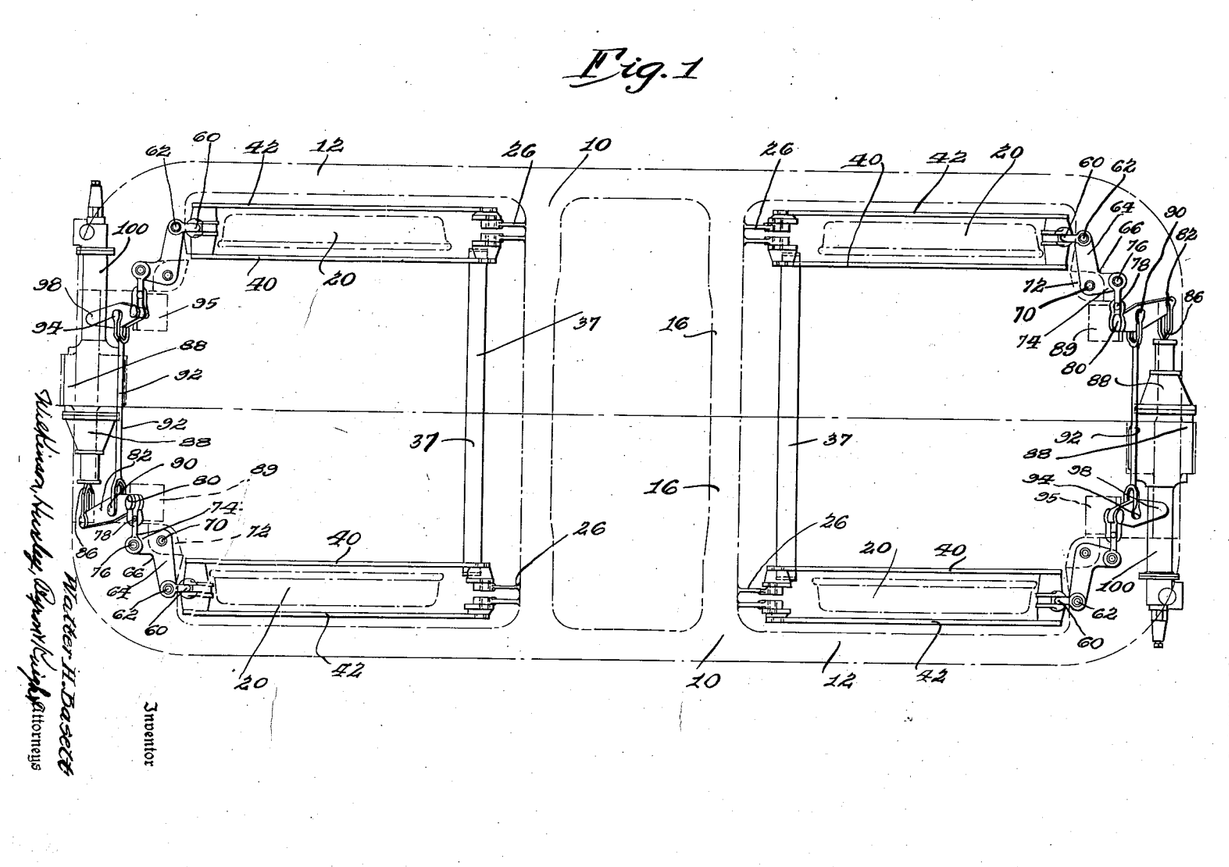
Figure 1 is a top plan view of a truck construction having applied thereto one form of brake mechanism embodying the invention.
Figure 2:
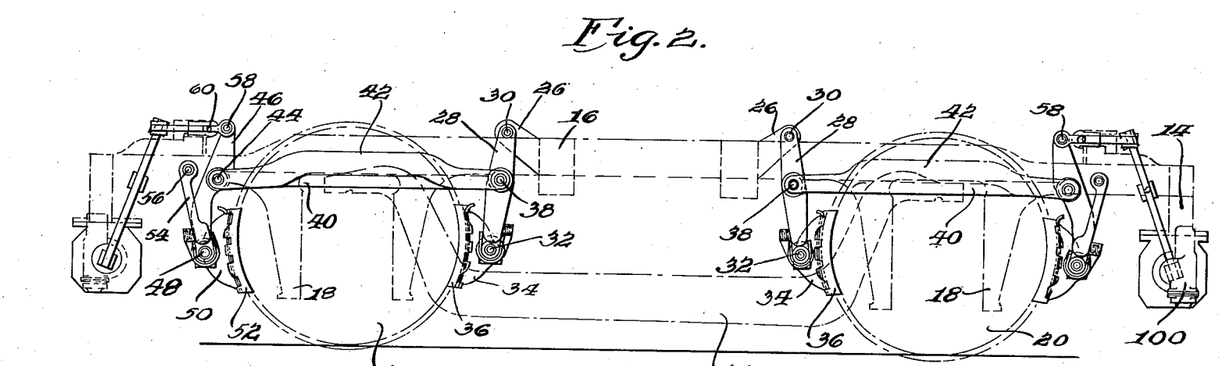
Figure 2 is a side elevation of the truck construction and brake mechanism illustrated in Figure 1.
Figure 3:
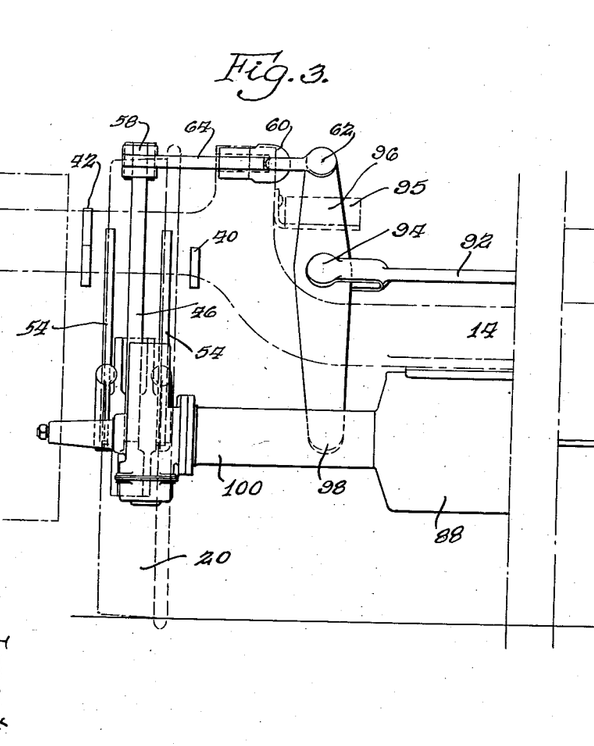
Figure 3 is an enlarged fragmentary end elevation of the truck construction illustrated in Figures 1 and 2.
Figure 4:
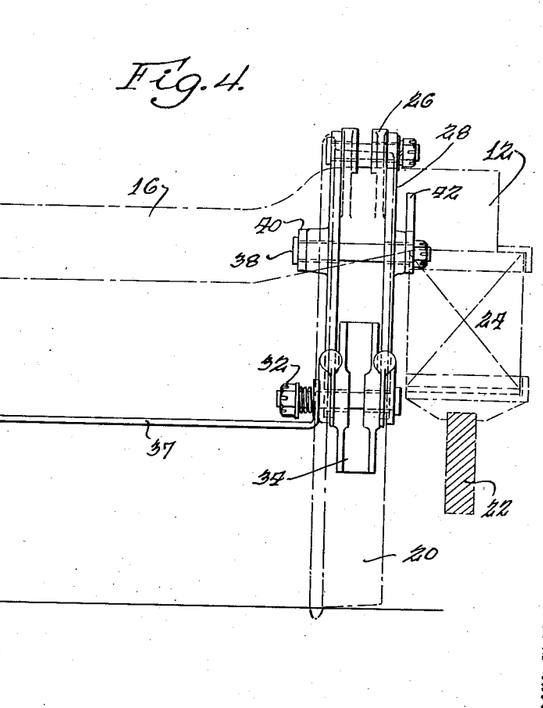
Figure 4 is an enlarged fragmentary transverse sectional elevation taken substantially in the plane of the transverse center line of the truck.

Referring first of all more particularly to the construction illustrated in Figures 1 to 4 inclusive, which may be used for either a motor or trailer truck, the truck frame 10 includes spaced side frames 12 integrally connected adjacent the ends thereof by means of the end rails 14, and integrally connected inwardly of said end rails by means of the transverse spaced transoms 16 adapted to accommodate a bolster (not shown). The side frame, in the modification shown, is provided with the spaced pedestals 18 adapted to receive journal means (not shown) such as a journal box adapted to have cooperative relation with the journal ends of the wheel and axle assemblies 20. The spaced journal means are provided with the longitudinally extending equalizer 22 disposed between said journal boxes and provided with the usual resilient means such as springs, indicated generally at 24, interposed between said equalizers and side frames.

As each of the wheel and axle assemblies disposed at opposite ends of the truck is provided with individual brake mechanism, it will be sufficient to describe the mechanism for only a single wheel and axle assembly, corresponding numerals indicating corresponding parts of the similar mechanism of the other wheel and axle assembly, it being noted, however, that the horizontally disposed transversely extending operating cylinders at opposite ends of the truck operate in opposite directions.

The transom 16 is provided with the bracket 26 to which the dead truck lever 28 disposed in the plane of the wheel is pivotally connected as at 30, the lower end of said dead truck lever being pivotally connected as at 32 to the brake head 34 provided with the brake shoes 36 adapted to have braking cooperation with the periphery of the wheel adjacent the inner side thereof. The dead truck levers on opposite sides of the truck are preferably connected by straps 37 connected at the pivots 32. The dead truck lever 28 is pivotally connected intermediate the ends thereof as at 38 to the inner and outer spaced straps 40 and 42 embracing the wheel and being pivotally connected as at 44 to the live truck lever 46 intermediate the ends thereof, said live lever being likewise disposed in the plane of the wheel, the spaced straps being disposed above the axle of the wheel and axle assembly.

The lower end of the live truck lever is pivotally connected as at 48 to the brake head 50 provided with the brake shoe 52 adapted to have braking cooperation with the periphery of the wheel on the outer side thereof. The hanger link 54 is pivotally connected as at 48 to the brake head and live truck lever, and is pivotally connected as at 56 to the side frame for pivotally supporting the live truck lever and its associated mechanism. The upper end of the live truck lever is pivotally connected as at 58 to the clevis 60 which is pivotally connected as at 62 to the outer arm 64 of the dead bell crank or dead frame lever 66 pivotally connected as at 70 to the bracket 72 provided on the truck frame inwardly of the wheels, said bell crank being substantially horizontally disposed.

The inner arm 74 of the bell crank is pivotally connected as at 76 to the clevis 78, which is pivotally connected as at 80 to the upper end of the upwardly and inwardly extending live cylinder lever 82, the lower end of said live cylinder lever being pivotally connected as at 84 to the piston or push rod 86 of the operating cylinder 88. A bracket 89 may be provided on the side frame to slidably support the live cylinder lever. The live cylinder lever is pivotally connected intermediate the ends thereof as at 90 to the pull rod 92 which is preferably disposed above the brake cylinder, the other end of said pull rod being pivotally connected as at 94 to the upwardly and inwardly extending dead cylinder lever 96 intermediate the ends thereof. A bracket 95 may be provided on the truck frame to slidably support said dead cylinder lever. The lower end of said dead cylinder lever is pivotally connected as at 98 to the automatic slack adjuster 100 provided on the operating cylinder 88 and extending in a direction opposite to the direction of operation of the piston. Though the cylinder is shown as provided with an automatic slack adjuster, the slack adjuster may be provided on the truck frame, or the cylinder may be provided with a manual slack adjuster or a bracket provided with a plurality of apertures for receiving the pivotal connection between the dead cylinder lever and its support.

In operation of this form of brake mechanism the cylinders at opposite ends of the truck may be selectively operated separately, serially or simultaneously. Assuming the brakes to be in released position, outward movement of the piston 86 causes the lower end of the live cylinder lever to be moved outwardly toward its adjacent side frame, thus causing similar movement of the pull rod 92, moving the dead cylinder lever inwardly about its pivot 98. Continued movement of the live cylinder lever causes the upper end of the live cylinder lever to be moved inwardly, and inward movement of the upper ends of the live and dead cylinder levers causes movement inwardly of the arm 74 of the bell crank 66, thus causing the upper end of the live truck levers to be moved toward their adjacent end rails. This movement of the live truck lever causes the straps 40 and 42 to move the dead truck lever to apply the brake shoe 36. Continued movement of the upper end of the live truck lever 46 will cause movement about the pivot 44 to apply the outer brake shoe 52. Return movement of the piston will of course operate the brake mechanism to release the brakes in a direction opposite to that of applied position.

Figure 5:
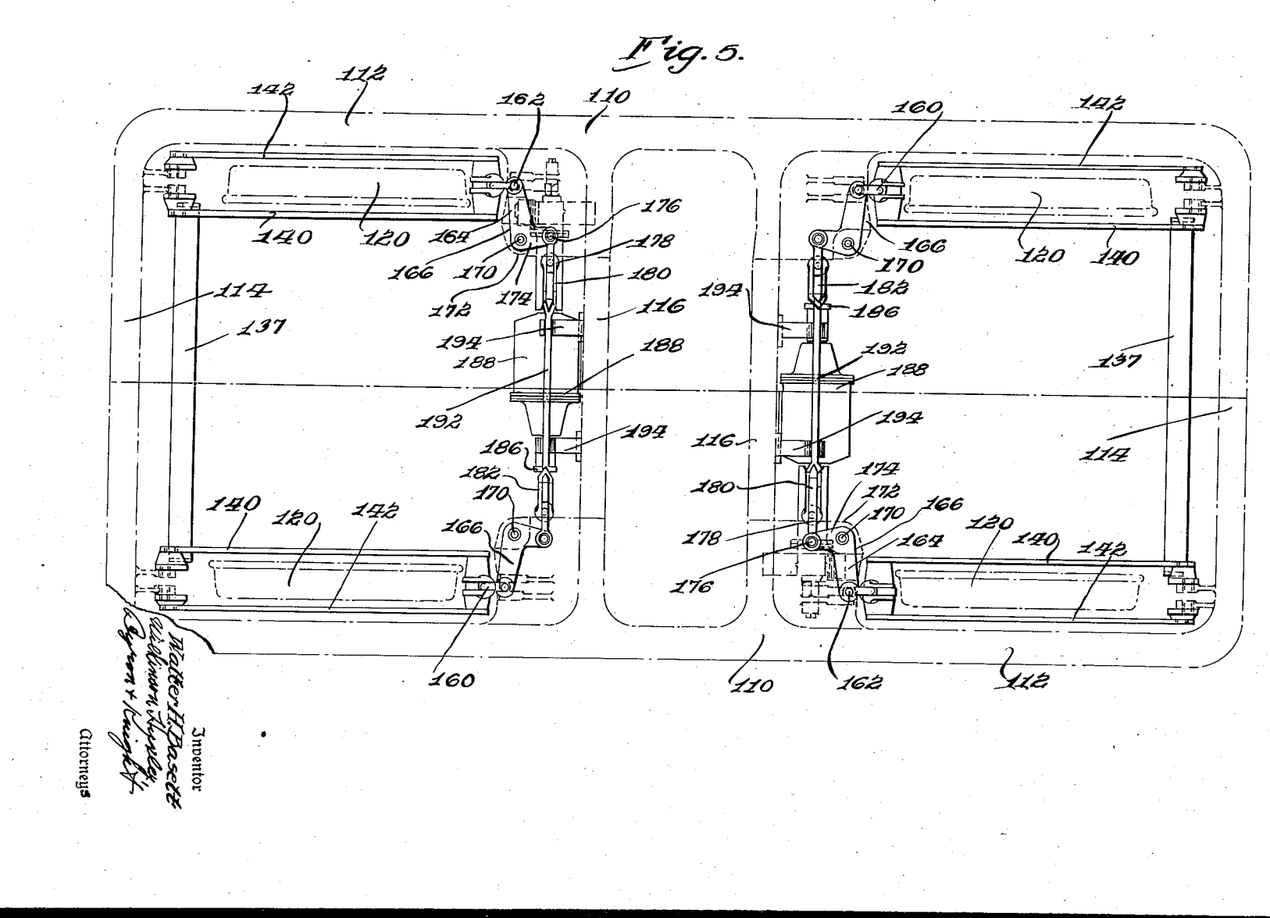
Figure 5 is a top plan view of a truck construction having applied thereto a modified form of brake mechanism embodying the invention.
Figure 6:
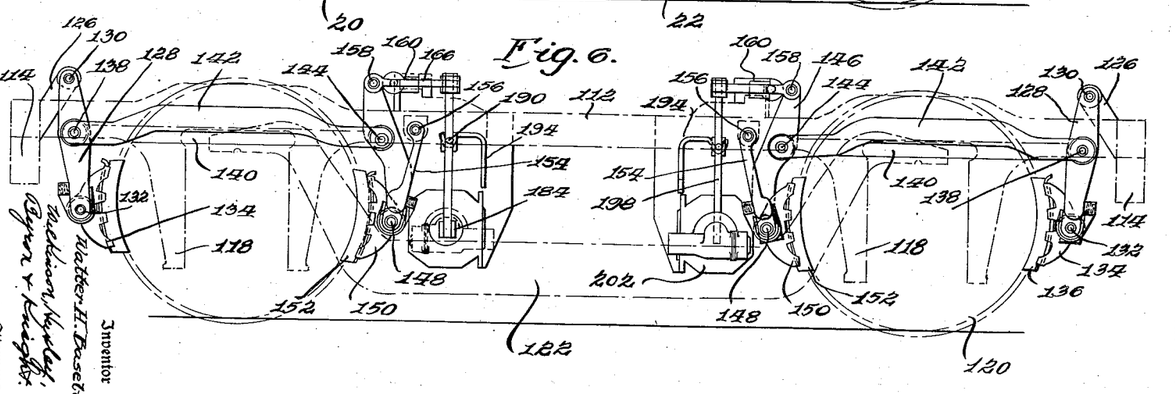
Figure 6 is a side elevation of the truck construction illustrated in Figure 5.
Figure 7:
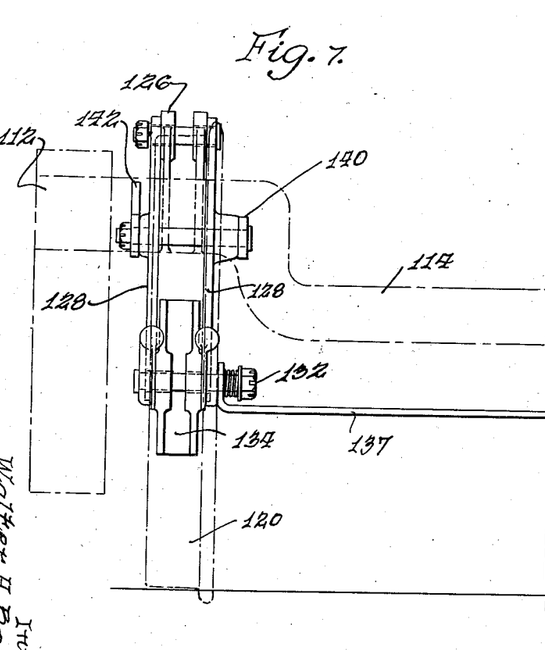
Figure 7 is an enlarged fragmentary end elevation of the truck construction illustrated in Figures 5 and 6.
Figure 8:
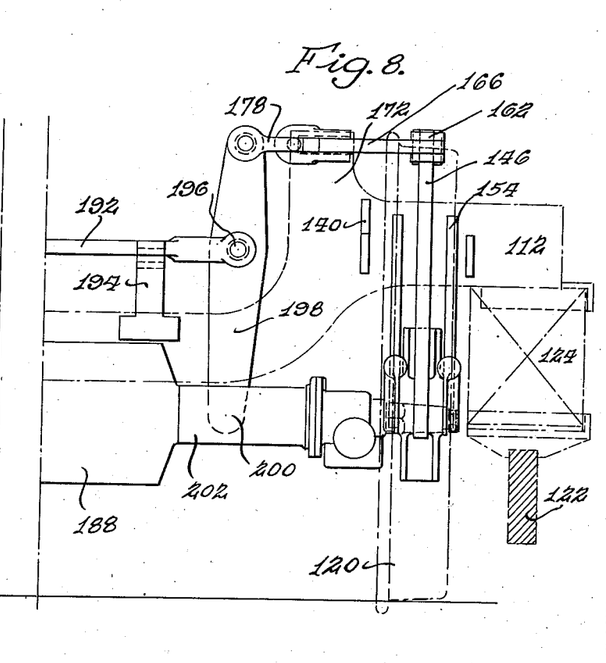
Figure 8 is an enlarged fragmentary transverse sectional elevation taken substantially in the plane of the transverse center line of the truck.

Referring now more particularly to the construction such as illustrated in Figures 5 to 8 inclusive, which is particularly applicable for trailer trucks, the truck frame 110 includes the spaced side frames 112 connected adjacent the ends thereof by the end rails 114. The side frames are connected inwardly of said end rails by means of the spaced transoms 116 adapted to accommodate a bolster (not shown). The side frame in this modification is provided with the spaced pedestals 118 adapted to receive journal means (not shown) such as a journal box adapted to have cooperative engagement with the journal means of the wheel and axle assemblies 120. The spaced journal means are provided with a longitudinally extending equalizer 122 disposed between said journal boxes and provided with the usual resilient means such as springs, indicated generally at 124, interposed between said equalizers and side frames.

As each of the wheel and axle assemblies disposed at opposite ends of the truck is provided with individual brake mechanism, it will be sufficient to describe the mechanism for only a single wheel and axle assembly, corresponding numerals indicating corresponding parts of similar mechanism of the other wheel and axle assembly, it being noted, however, that the horizontally disposed transversely extending operating cylinders for the mechanism at the opposite ends of the truck operate in opposite directions.

The end rail 114 is provided with the bracket 126 to which the dead truck lever 128 is pivotally connected as at 130, said truck lever being disposed in the plane of the wheel. The lower end of said truck lever is pivotally connected as at 132 to the outer brake head 134 provided with the brake shoe 136 adapted to have braking operation with the periphery of the wheel adjacent the outer side thereof. The dead truck levers on opposite sides of the truck are preferably connected by straps 137 connected at the pivots 132. The dead truck lever 128 is pivotally connected intermediate the ends thereof as at 138 to the inner and outer spaced straps 140 and 142 and embracing the wheel, said straps being pivotally connected as at 144 to the live truck lever 146 intermediate the ends of said lever, said lever being likewise disposed in the plane of the wheel, the spaced straps being disposed above the axle of the wheel and axle assembly.

The lower end of the live truck lever is pivotally connected as at 148 to the brake head 150 provided with the brake shoe 152 adapted to have cooperation with the periphery of the wheel on the inner side thereof. The hanger link 154 is pivotally connected as at 148 to the brake head and live truck lever and is pivotally connected as at 156 to a suitable bracket provided on the side frame for pivotally supporting the live truck lever and its associated mechanism. The upper end of the live truck lever is pivotally connected as at 158 to the clevis 160 which is pivotally connected as at 162 to the outer arm 164 of the dead bell crank or dead frame lever 166 pivotally connected as at 170 to the bracket 172 provided on the truck frame between the side frame and transom.

The inner arm 174 of the bell crank is pivotally connected as at 176 to the clevis 178 which is pivotally connected as at 180 to the upper end of the substantially vertically disposed live cylinder lever 182, the lower end of said live cylinder lever being pivotally connected as at 184 to the piston or push rod 186 of the operating cylinder 188. The live cylinder lever is pivotally connected intermediate the ends thereof as at 190 to the pull rod 192 which is preferably disposed above the brake cylinder and positioned by spaced brackets 194, the other end of said pull rod being pivotally connected as at 196 to the dead cylinder lever 198 intermediate the ends thereof. The lower end of the dead cylinder lever is pivotally connected as at 200 to the automatic slack adjuster 202 provided on the operating cylinder 188 and extending in a direction opposite to the direction of operation of the piston. Though the cylinder is shown as provided with an automatic slack adjuster, as before the automatic slack adjuster may be provided on the truck frame, or the cylinder or truck frame may be provided with a manual slack adjuster, or a bracket with a plurality of apertures for receiving the pivotal connection between the dead cylinder lever and its support.

Where an automatic slack adjuster is used it may be substantially of the construction and operation as that shown in Patent No. 1,991,330 to Ormah R. Mitchell, issued February 12, 1935, or of any desirable form.

In operation of this form of brake mechanism, the cylinders at opposite ends of the truck may be selectively operated separately, serially or simultaneously. Assuming the brakes to be in released position, outward movement of the piston 186 causes the lower end of the live cylinder lever to be moved outwardly toward its adjacent side frame, thus causing similar movement of the pull rod 192, moving the dead cylinder lever inwardly about its pivot 200. Continued movement of the live cylinder lever causes the upper end of the live cylinder lever to be moved inwardly, and inward movement of the upper ends of the live and dead cylinder levers causes movement inwardly of the arm 174 of the bell crank 166, thus causing the upper ends of the live truck levers to be moved toward their adjacent transoms.

This movement of the live truck lever causes the straps 140 and 142 to move the dead truck lever to apply the brake shoe 136. Continued movement of the upper end of the live truck lever 146 will cause movement about the pivot 144 to apply the inner brake shoe 152. Return movement of the piston will of course operate the brake mechanism to release the brakes in a direction opposite to that of applied position.

It is to be understood that I do not wish to be limited by the exact embodiments of the device shown, which are merely by way of illustration and not limitation, as various and other forms of the device will of course be apparent to those skilled in the art without departing from the spirit of the invention or the scope of the claims.

What is claimed is—

1. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, a connection between said levers disposed above the wheel center, a bell crank pivoted to said truck frame and connected to one of said brake levers, and a transversely disposed brake cylinder supported on said truck frame and operatively connected to said bell crank.

2. In a brake arrangement, the combination of a truck frame including a side frame, end rail members and spaced transom members, wheels supporting said truck frame, brake rigging having cooperative relation to one of said wheels, said rigging including a live and dead brake lever disposed on opposite sides of said wheel, a connection between said levers, a bell crank pivoted to said truck frame immediately adjacent said live lever and connected thereto, and a transversely disposed brake cylinder supported on one of said first named members and operatively connected to said bell crank.

3. In a brake arrangement, the combination of a truck frame including a side frame, end rail members and spaced transom members, wheels supporting said truck frame, brake rigging having cooperative relation to one of said wheels, said rigging including a live and dead brake lever disposed on opposite sides of said wheel, a connection between said levers, a bell crank pivoted to said truck frame immediately adjacent said live lever and connected thereto, and a transversely disposed brake cylinder supported on one of said end rail members and operatively connected to said bell crank.

4. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, a connection between said levers, a bell crank pivoted to said truck frame and connected to one of said brake levers, and a transversely disposed brake cylinder supported on one of said transom members and operatively connected to said bell crank.

5. In a brake arrangement, the combination of a truck frame, a wheel disposed in supporting relation thereto, brake means for said wheel including a dead and live brake lever disposed on opposite sides of said wheel, operating means for operating said levers simultaneously, said operating means including a transversely disposed operating cylinder supported on said truck frame, and power transmitting means between said cylinder and said levers, said power transmitting means including a lever connected to said live lever and pivoted to said frame and disposed on the same side of said wheel as said live lever.

6. In a brake arrangement, the combination of a truck frame, a wheel disposed in supporting relation thereto, brake means for said wheel including a dead and live brake lever disposed on opposite sides of said wheel, operating means for said brake levers including a transversely disposed operating cylinder, and a cylinder lever operated thereby, said cylinder lever being disposed on the same side of said wheel as said live lever and being operatively connected thereto.

7. In a brake arrangement, the combination of a truck frame, said truck frame including spaced side frames, a transverse connecting member, a wheel and axle assembly supporting said truck frame, brake rigging including brake levers disposed to have braking cooperation with opposite sides of the wheels, a connection between said levers disposed above the wheel center, and a transversely disposed operating cylinder supported on said transverse member and operatively connected to said levers.

8. In a brake arrangement, the combination of a truck frame, said truck frame including spaced side frames, a transverse connecting member, a wheel and axle assembly supporting said truck frame, brake rigging including a live and dead truck lever disposed to have braking cooperation with the wheels, a transversely disposed operating cylinder supported on said transverse member, live and dead cylinder levers connected to each other, one of said levers being connected to the piston of the operating cylinder, and the other of said levers being disposed on the same side of a wheel as said live lever and being operatively connected thereto.

9. In a brake arrangement, the combination of a truck frame, said truck frame including spaced side frames, a transverse connecting member, a wheel and axle assembly supporting said truck frame, brake rigging including a live and dead truck lever disposed to have braking cooperation with the wheels, a connection between said levers disposed above the wheel center, a transversely disposed operating cylinder supported on said transverse member, live and dead cylinder levers connected to each other, one of said levers being connected to the piston of the operating cylinder, and the other of said levers being disposed on the same side of a wheel as said live lever and being operatively connected thereto.

10. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed above the adjacent axle, a bell crank disposed adjacent each live truck lever and pivoted to said truck frame, said bell crank being pivotally connected to the adjacent live truck lever, a transversely disposed operating cylinder supported on each end rail and having an automatic slack adjuster thereon, a dead cylinder lever pivotally connected to said automatic slack adjuster and to the adjacent bell crank, a live cylinder lever pivotally connected to the piston of said cylinder on the side opposite said slack adjuster and pivotally connected to its adjacent live truck lever, and a connection between said live and dead cylinder levers intermediate the ends thereof.

11. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed above the adjacent axle, a bell crank disposed adjacent each live truck lever and pivoted to said truck frame, said bell crank being pivotally connected to the adjacent live truck lever, a horizontally disposed operating cylinder connected to each of said end rails and having a piston operating in the direction of one of said side frames, a support on said cylinder extending in a direction toward the opposite side frame, a dead cylinder lever pivoted to said support and to the adjacent bell crank, a live cylinder lever pivotally connected to said piston and to its adjacent bell crank, and a connection between said cylinder levers intermediate the ends thereof.

12. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the outside of each wheel, a live truck lever supported on the inside of each wheel, straps connecting pairs of live and dead truck levers and disposed above the adjacent axle, a bell crank disposed adjacent each live truck lever and pivoted to said truck frame, said bell crank being pivotally connected to the adjacent live truck lever, a transversely disposed operating cylinder supported on each transom and having an automatic slack adjuster thereon, a dead cylinder lever pivotally connected to said automatic slack adjuster and to the adjacent bell crank, a live cylinder lever pivotally connected to the piston of said cylinder on the side opposite said slack adjuster and pivotally connected to its adjacent live truck lever, and a connection between said live and dead cylinder levers intermediate the ends thereof.

13. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the outside of each wheel, a live truck lever supported on the inside of each wheel, straps connecting pairs of live and dead truck levers and disposed above the adjacent axle, a bell crank disposed adjacent each live truck lever and pivoted to said truck frame, said bell crank being pivotally connected to the adjacent live truck lever, a horizontally disposed operating cylinder connected to each of said transoms and having a piston operating in the direction of one of said side frames, a support on said cylinder extending in a direction toward the opposite side frame, a dead cylinder lever pivoted to said support and to the adjacent bell crank, a live cylinder lever pivotally connected to said piston and to its adjacent bell crank, and a connection between said cylinder levers intermediate the ends thereof.

14. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the outside of each wheel, a live truck lever supported on the inside of each wheel, straps connecting pairs of live and dead truck levers and disposed above the adjacent axle, a bell crank disposed adjacent each live truck lever and pivoted to said truck frame, said bell crank being pivotally connected to the adjacent live truck lever, a transversely disposed operating cylinder supported on each transom and having an automatic slack adjuster thereon, a dead cylinder lever pivotally connected to said automatic slack adjuster and to the adjacent bell crank, a live cylinder lever pivotally connected to the piston of said cylinder on the side opposite said slack adjuster and pivotally connected to its adjacent live truck lever, a connection between said live and dead cylinder levers intermediate the ends thereof, and a support on said transoms for the adjacent connection.

15. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism adapted to have braking cooperation with the wheels and including live truck levers disposed on the side of said wheels adjacent a rail, and a horizontally and transversely disposed brake cylinder supported on one of said end rails and operatively connected to said live truck levers.

16. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism adapted to have braking cooperation with the wheels, and a horizontally and transversely disposed brake cylinder supported on one of said transoms inboard of the adjacent wheel and axle assembly and operatively connected to said brake mechanism.

17. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism including live and dead truck levers adapted to have braking cooperation with the wheels, a horizontally disposed brake cylinder connected to each of said end rails and having a piston operating in the direction of one of said side frames, said cylinder being disposed on the same side of the wheels as said live truck levers, a support on said cylinder extending in a direction toward the opposite side frame, a dead cylinder lever pivoted to said support and to the adjacent live truck lever on one side of the truck, a live cylinder lever pivotally connected to said piston and to the live truck lever on the other side of the truck, and a connection between said cylinder levers intermediate the ends thereof.

18. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism adapted to have braking cooperation with the wheels, a horizontally disposed brake cylinder connected to each of said transoms and having a piston operating in the direction of one of said side frames, a dead cylinder lever fulcrumed from said cylinder opposite said piston and connected to the adjacent brake mechanism, a live cylinder lever pivotally connected to said piston and to the brake mechanism adjacent said live cylinder lever, and a connection between said cylinder levers intermediate the ends thereof.

19. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel and in the plane thereof, a connection between said levers disposed above the wheel center, a dead lever pivoted to said truck frame and connected to one of said brake levers, and a transversely disposed brake cylinder supported on said truck frame and operatively connected to said dead lever.

20. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel and in the plane thereof, one of said brake levers being a dead lever and the other of said brake levers being a live lever, a connection between said levers disposed above the wheel center, a dead lever pivoted to said truck frame and connected to the live brake lever, and a transversely disposed brake cylinder supported on said truck frame and operatively connected to said last named dead lever.

21. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, a connection between said levers disposed above the wheel center, a dead lever pivoted to said truck frame and connected to one of said brake levers, and a transversely disposed brake cylinder supported on said truck frame and operatively connected to said dead lever.

22. In a brake arrangement, the combination of a truck frame including a side frame, end rail members and spaced transom members, wheels supporting said truck frame, brake rigging having cooperative relation to one of said wheels, said rigging including brake levers disposed on opposite sides of said wheel, one of said brake levers being a dead lever and the other of said brake levers being a live lever, a connection between said levers disposed above the wheel center, a dead lever pivoted to said truck frame and connected to the live brake lever, and a transversely disposed brake cylinder supported on said truck frame and operatively connected to said last named dead lever.

23. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed above the adjacent axle, a dead frame lever disposed adjacent each live truck lever and pivoted to said truck frame, said frame lever being pivotally connected to the adjacent live truck lever, a transversely disposed operating cylinder supported on each end rail and having an automatic slack adjuster thereon, a dead cylinder lever pivotally connected to said automatic slack adjuster and to the adjacent frame lever, a live cylinder lever pivotally connected to the piston of said cylinder on the side opposite said slack adjuster and pivotally connected to its adjacent live truck lever, and a connection between said live and dead cylinder levers intermediate the ends thereof.

24. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, a dead truck lever pivoted to said truck frame on the inside of each wheel, a live truck lever supported on the outside of each wheel, straps connecting pairs of live and dead truck levers and disposed above the adjacent axle, a dead frame lever disposed adjacent each live truck lever and pivoted to said truck frame, said frame lever being pivotally connected to the adjacent live truck lever, a horizontally disposed operating cylinder connected to each of said end rails and having a piston operating in the direction of one of said side frames, a support on said cylinder extending in a direction toward the opposite side frame, a dead cylinder lever pivoted to said support and to the adjacent frame lever, a live cylinder lever pivotally connected to said piston and to its adjacent frame lever, and a connection between said cylinder levers intermediate the ends thereof.

25. In a brake arrangement, the combination of a truck frame including side frame members and a transverse connecting member, wheels supporting said truck frame, brake rigging adapted to have braking cooperation with one of said wheels, said rigging including a live and dead brake lever disposed on opposite sides of said wheel, a connection between said levers, a substantially horizontally disposed frame lever pivoted intermediate its ends to said frame immediately adjacent said live lever and connected at one end to said live lever, a horizontally disposed brake cylinder supported on said truck frame below said frame lever, and a cylinder lever connected to the piston of said cylinder at one end of said lever and connected to the other end of said frame lever.

26. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, a connection between said levers above the wheel center, a substantially horizontally disposed frame lever pivoted intermediate its ends to said frame and at one end to one of said brake levers, a horizontally disposed brake cylinder supported on said truck frame below said frame lever, and a cylinder lever connected to the piston of said cylinder at one end of said lever and connected to the other end of said frame lever.

27. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, one of said levers being a dead lever and the other of said levers being a live lever, a connection between said levers above the wheel center, a substantially horizontally disposed frame lever pivoted intermediate its ends to said frame and at one end to the upper end of said live brake lever, a horizontally disposed brake cylinder supported on said truck frame below said frame lever, and a cylinder lever connected to the piston of said cylinder at one end of said lever and connected to the other end of said frame lever.

28. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, one of said levers being a dead lever and the other of said levers being a live lever, a connection between said levers above the wheel center, a substantially horizontally disposed frame lever pivoted intermediate its ends to said frame and at one end to the upper end of said live brake lever, a horizontally disposed brake cylinder supported on said truck frame below said frame lever, a cylinder lever connected to the piston of said cylinder at one end of said lever and connected to the other end of said frame lever, and a pivot for said cylinder lever intermediate the piston connected to said cylinder lever and the frame lever connected to said cylinder lever.

29. In a brake arrangement, the combination of a truck frame including side frame members and a transverse connecting member, wheels supporting said truck frame, brake rigging adapted to have braking cooperation with one of said wheels, said rigging including a live and dead brake lever disposed on opposite sides of said wheel, a connection between said levers disposed above the wheel center, a substantially horizontally disposed frame lever pivoted intermediate its ends to said frame immediately adjacent said live lever and connected at one end to said live lever, a horizontally disposed brake cylinder supported on said truck frame below said frame lever and disposed to operate transversely of said truck frame, and a cylinder lever connected to the piston of said cylinder at one end of said lever and connected to the other end of said frame lever.

30. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, a connection between said levers above the wheel center, a substantially horizontally disposed frame lever pivoted intermediate its ends to said frame and at one end to one of said brake levers, a horizontally disposed brake cylinder supported on said truck frame below said frame lever and disposed to operate transversely of said truck frame, and a cylinder lever connected to the piston of said cylinder at one end of said lever and connected to the other end of said frame lever.

31. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, one of said levers being a dead lever and the other of said levers being a live lever, a connection between said levers above the wheel center, a substantially horizontally disposed frame lever pivoted intermediate its ends to said frame and at one end to the upper end of said live brake lever, a horizontally disposed brake cylinder supported on said truck frame below said frame lever and disposed to operate transversely of said truck frame, and a cylinder lever connected to the piston of said cylinder at one end of said lever and connected to the other end of said frame lever.

32. In a brake arrangement, the combination of a truck frame including side frame members and a transverse connecting member, wheels supporting said truck frame, brake rigging adapted to have braking cooperation with one of said wheels, said rigging including brake levers disposed on opposite sides of said wheel and in the plane thereof, one of said levers being a dead lever and the other of said levers being a live lever, a connection between said levers above the wheel center, a substantially horizontally disposed frame lever pivoted intermediate its ends to said frame and at one end to the upper end of said live brake lever, a horizontally disposed brake cylinder supported on said truck frame below said frame lever and disposed to operate transversely of said truck frame, a cylinder lever connected to the piston of said cylinder at one end of said lever and connected to the other end of said frame lever, and a pivot for said cylinder lever intermediate the piston connected to said cylinder lever and the frame lever connected to said cylinder lever.

33. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism including live and dead truck levers adapted to have braking cooperation with the wheels, a horizontally disposed brake cylinder having a piston operating in the direction of one of said side frames, said cylinder being disposed on the same side of the wheels as said live truck levers, a support on said cylinder extending in a direction toward the opposite side frame, a dead cylinder lever pivoted to said support and operatively connected to the adjacent live truck lever on one side of the truck, a live cylinder lever pivotally connected to said piston and operatively connected to the live truck lever on the other side of the truck, and a connection between said cylinder levers intermediate the ends thereof.

34. In a brake arrangement, the combination of a truck frame having spaced side frames, end rails connecting said side frames adjacent the ends thereof, spaced transoms connecting said side frames intermediate said end rails, wheel and axle assemblies disposed to support said truck frame between said transoms and end rails, brake mechanism adapted to have braking cooperation with the wheels, said mechanism including a dead truck lever pivoted to said truck frame on the inside of each of the wheels and a live truck lever supported on the outside of said wheels, and horizontally disposed brake actuating means operatively connected to said brake mechanism and disposed below the wheel centers.

35. In a railway car truck, a frame having side members and a transom, a supporting wheel and axle assembly, power means mounted on said transom transversely of said frame, brake rigging for said assembly and connections between said power means and said rigging comprising interconnected live and dead cylinder levers connected to opposite ends of said power means, said cylinder levers having their opposite ends connected to said brake rigging at opposite sides of the truck.

36. In a railway car truck, a frame having side rails and a transom, a supporting wheel and axle assembly, power means mounted on said transom transversely of said truck, braking means for the wheels of said assembly and connections between said power means and said braking means in the form of interconnected vertically arranged live and dead cylinder levers connected at their lower ends to opposite ends of said power means and operatively connected at their upper ends to said braking means at opposite sides of the truck.

37. In a railway car truck, a frame having side rails and a transom, a supporting wheel and axle assembly, power means mounted on said transom transversely of said truck, braking means for the wheels of said assembly and connections between said power means and said braking means, said connections comprising bell crank levers fulcrumed from the frame and connected to the braking means at each side of the truck and interconnected live and dead cylinder levers connected at their lower ends to opposite ends of said power means and at their upper ends to said bell crank levers respectively.

38. In a railway truck, a frame having a transom, a supporting wheel and axle assembly, braking means for the wheels of said assembly, power means mounted on said transom transversely of said truck, and connections between said power means and said braking means including bell cranks on opposite sides of the frame, and interconnected live and dead cylinder levers connected at corresponding ends to opposite ends of said power means and at their other ends to said braking means through said bell cranks respectively.

39. In a railway truck, a frame having a transom, a supporting wheel and axle assembly, braking means for the wheels of said assembly, power means and slack adjusting means mounted on said transom transversely of the truck, and connections between said power means and said braking means in the form of bell cranks mounted on the sides of said frame and having corresponding arms connected to the braking means at opposite sides of the truck, and interconnected live and dead cylinder levers connected at corresponding ends to said power means and said slack adjusting means respectively and at their other ends connected to the other arms of said bell cranks.

WALTER H. BASELT.